Patented July 30, 1940

2,209,717

UNITED STATES PATENT OFFICE 2,209,717

RECORDING AND CONTROLLING SYSTEM

Charles O. Fairchild and Soren B. Osterlund, St. Albans, N. Y., assignors to Charles J. Tagliabue Mfg. Co., Brooklyn, N. Y., a corporation of New York Application February 25, 1938, Serial No. 192,488

24 Claims. (Cl. 234—5.5)

The present invention relates to systems for controlling and/or obtaining a record of a condition, i. e., a measurable magnitude, such as temperature, pressure, or voltage, etc. in conjunction with measuring and recording instruments used in the controlling and/or recording of such conditions, and particularly in obtaining a record of a final condition following a rapid change thereof in the system being tested.

It is one of the objects of the invention to provide such a system with a high degree of speed, sensitivity and accuracy, combined with simplicity, ruggedness and compactness of structure and reliability of operation.

Our invention relates also to apparatus for operating measuring instrumentalities for recording and/or controlling. It relates particularly to equipment of the class in which such instrumentalities are sequentially connected to a number of means responsive to different variables or to conditions, as those of temperature, at a plurality of differently located points, as rapidly as possible without loss of accuracy.

Another object of our invention is to provide a novel apparatus for actuating a selector within a reasonably short time after a movable indicating means has attained a position corresponding to the condition being measured and then only if it stays there for a long enough interval to make certain that this is its true position.

A particular object of our invention is to provide electromagnetic means for governing the initiation of the above-mentioned action in which the electromagnetic means responds to the measuring means.

A further object of our invention is to provide a sequentially printing temperature recorder, for example, in which the printing is related to the sequential advancing, with means for causing it to print at regular intervals, say every 30 seconds, and to advance to the next thermocouple providing that the marking means has reached its proper position before the end of each interval, but which recorder will neither print nor advance until such correspondence is reached. A related object is to provide means for alternatively permitting high speed printing as elsewhere described herein. A further and particular object is to provide such a recorder with manually operable means for predetermining whether the printing occurs at regular intervals or at high speed, as above mentioned.

It is a specific object of our invention to provide a regularly printing recorder, as set forth in the preceding paragraph, in which the time for full traverse of the chart materially exceeds that of the regular printing interval; thus, e. g., a 30 second printing cycle would be suitable for a recorder having a 60 second chart-traversing time. By the use of this method of recording, the normal recording interval is so seldom exceeded as to negligibly extend the average printing time, while this normal recording interval is so short, relative to the chart-traversing time, as to generally provide an advantageous record for all but the highest speed records. However, when the latter are required, such a recorder may be instantly converted to record at high speed.

A further object of our invention is to provide an improved and compact unitary element for actuating such a selector and/or recorder.

It has long been a problem in the art to find some method of obtaining a record of a change in temperature at the earliest possible moment after the rate of change has decreased to a predetermined value. For example, this problem arises when a thermocouple must be inserted in a bath of destructive liquid, as a molten salt, in which case it is desirable to leave the thermocouple in the bath only so long as is necessary for the thermocouple to attain the temperature of the bath. We believe we are the first to have attained this long sought end. In such a case, our apparatus ceases printing (in its application to a recording instrument) from the time when the thermocouple is removed from its surrounding air, where it had attained a substantially constant temperature, until it reaches near enough to the temperature of the bath when the recorder again operates, this renewed operation of the printing means indicating to an attendant that he can immediately withdraw the thermocouple from the bath and thus shorten the duration of its exposure to destructive influences.

In order more clearly to show the advance in the art made by our invention it may be well to briefly state that we are aware that others have provided means for printing, in regular cycles of a duration exceeding the chart-traversing time, the value of a condition, or of a plurality of conditions in sequence and by distinguishable characters or colors. This method is subject to the severe limitation that the recording means must wait an unduly long interval following a movement from one value to another, an interval long enough to take care of the worst possible lack of correspondence between the recording means and the condition.

We are also aware that others claim to have printed at a definite interval following the attainment of correspondence. While this latter method has the advantage of decreasing the total time necessary for printing a complete set of values, it is subject to the fundamental objection that the device will make a record of a condition even if vibration is present, as is often the case in commercial installations, thus producing a "stuttering" record of objectionable width on the chart.

We believe that we are first to overcome the defects of both of the foregoing methods since we are able to print within a reasonable duration following the attainment of correspondence and without waiting for a definitely fixed period, while at the same time we also have the advantage of printing only after the recording means has settled into substantial correspondence with the condition it is recording, thus producing on the chart a printed record of narrower width than has heretofore been attainable by any other similar device wherever appreciable vibration of the instrument existed. In this connection, it must be forcibly brought out that potentiometers of the galvanometer type must rely upon a sensitive galvanometer, such an element being peculiarly susceptible to vibration. The attainment of accuracies of record of the high order of a few hundredths of one percent of full scale and at high speed are possible for the first time with the means that we have provided. These advantages are of particular importance where an extremely sensitive device of this sort must be used for controlling, since it is vital in such case to control only on true and never on fictitious values.

It is a further particular object of our invention to provide a means for printing correctly the utmost possible number of different temperature values in a given time where the meter has appreciable inertia and may approach its final value somewhat slowly or momentarily overswing the proper value.

Specific objects of our invention are to provide improvements in connection with the multipoint photoelectric potentiometer disclosed herein as follows for temperature recording, by way of example: The galvanometer is continuously responsive to the difference between the selected E. M. F. and the balancing E. M. F., which permits the attainment of the shortest possible printing intervals and which continuous response is also of importance in controlling the variable. The galvanometer is of the mirror type with a low movement of inertia, which assists the promptness of balancing and rapidity of recording. This mirror cooperates with a phototube which has an amplifying system adapted to act in such a delayed manner as to permit a galvanometer of high sensitivity, with its accompanying difficulty of balancing, to be used in commercial instruments which are occasionally subject to otherwise error-causing vibration. A capacitor and associated resistors in the amplifier provide, for this purpose, an immediate response to a change followed by a gradual response, such responses being so timed as to effectively trap the light beam reflected from the galvanometer mirror and stably balance its image upon the edge of the phototube, instead of having the change set up a hunting cycle, which would otherwise be the tendency. Oscillating relays are governed by the delayed output from the amplifier so as to provide a balancing dead zone, adjacent oscillating zones in which balancing proceeds by short steps which are less and less frequent as the condition of exact balance is approached, and zones outside of these in which the balancing occurs at full speed.

Continuing, the potentiometer's balancing circuit includes means, controlled by the relays, for so advancing the balancing E. M. F. that the galvanometer will attain its position of balance while the potentiometer slider is still approaching its precise position for balancing. Also governed by these relays is the means for testing the condition of balance, a mechanism including a notched cam which continuously rotates, e. g., one revolution every three seconds, and a printing actuating link cooperating therewith and which is positioned relatively thereto by an electromagnet connected to the relays so as to have the link engage a pin on the notched cam when switches at the relays open, the arrangement being such that the link can operatively engage the pin only after nearly a complete revolution of the cam following the link's entry into the limited notch of the cam. The result is that high speed printing occurs within the first cam cycle following that testing cycle in which the link is continuously in contact with the cam. However, a shunting interrupter is provided for these relay switches so that these are ineffective for, say, 27 out of each 30 seconds, the remaining 3 seconds in which these relay switches are effective being just enough to cause printing in case both relay switches remain continuously open for the 3 second testing period. A manually operable switch, in series with the interrupter, selectively determines, by being open or shut, respectively whether the printing occurs at high speed as first described above or at the interruptor's regular intervals whenever both relay switches are continuously open for the effective testing period.

Still continuing, the marker provides a distinguishable mark for each temperature-measuring point and it, together with its point-selecting switch, is progressively advanced with each printing operation. A modification, not shown, provides limit switches for the marker carriage so that printing and advance to the next point automatically occur when the temperature at any point is outside the recording range.

Also, by having the regular printing interval less than the full chart traversing time but more than the usual time between printing operations at high speed, a highly desirable mode of printing is obtained: usually at regular short cycles and only seldom at longer intervals. The testing cam and interruptor are so made as to be automatically timed as described by having a pawl operate in synchronism with the testing cam, and a ratchet wheel, cyclically actuated by this pawl, carries the cams which open the interruptor switch for, say, the one testing period out of each ten. A detent pawl retains this ratchet wheel in its last set position. This arrangement gives a desirably short and accurately defined period of operation of the cams for operating the interruptor switch. It is readily to be seen by one skilled in this art that the above mentioned elements in fact effectively combine to produce an improved recording and/or controlling potentiometer.

These and other objects of our invention will appear to those skilled in the art from the accompanying drawings and specification, in which is illustrated and described a specific embodiment of our invention. It is our intention to claim all that we have disclosed that is new and useful.

In the figures, wherein like characters indicate like elements throughout.

The present application is a continuation-in-part of our abandoned U. S. application Serial No. 132,268, filed March 22, 1937 and contains all of the subject matter of such application.

Balancing period testing mechanism

Figures 1, 3:
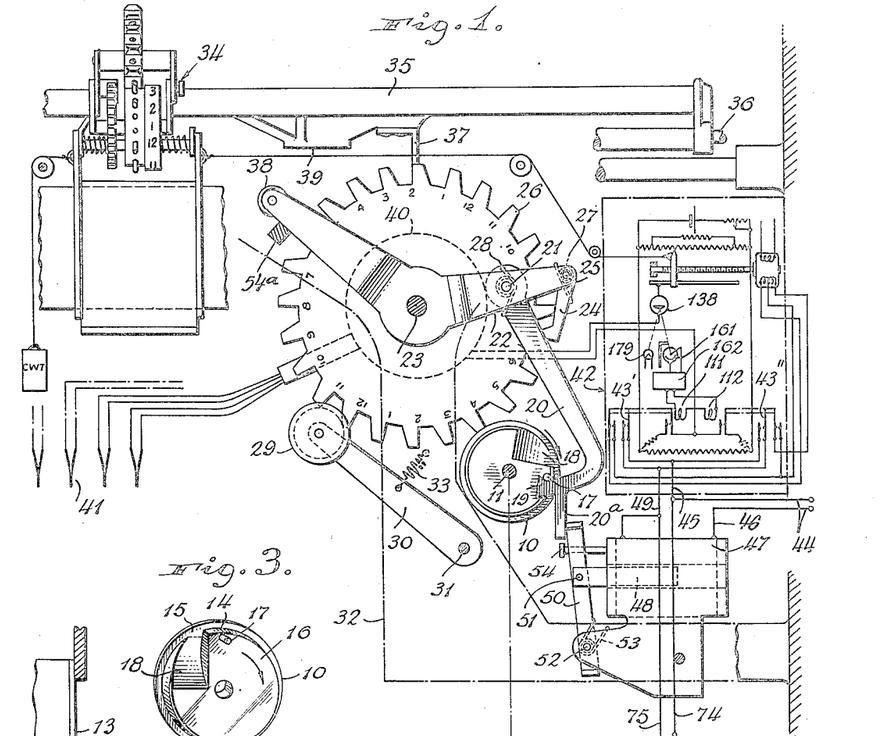
Fig. 1 is a somewhat diagrammatic front elevation of an apparatus embodying our invention.
Fig. 3 is a perspective view, generally from the front, of the unitary permissive cam and actuating means.
Figure 1:
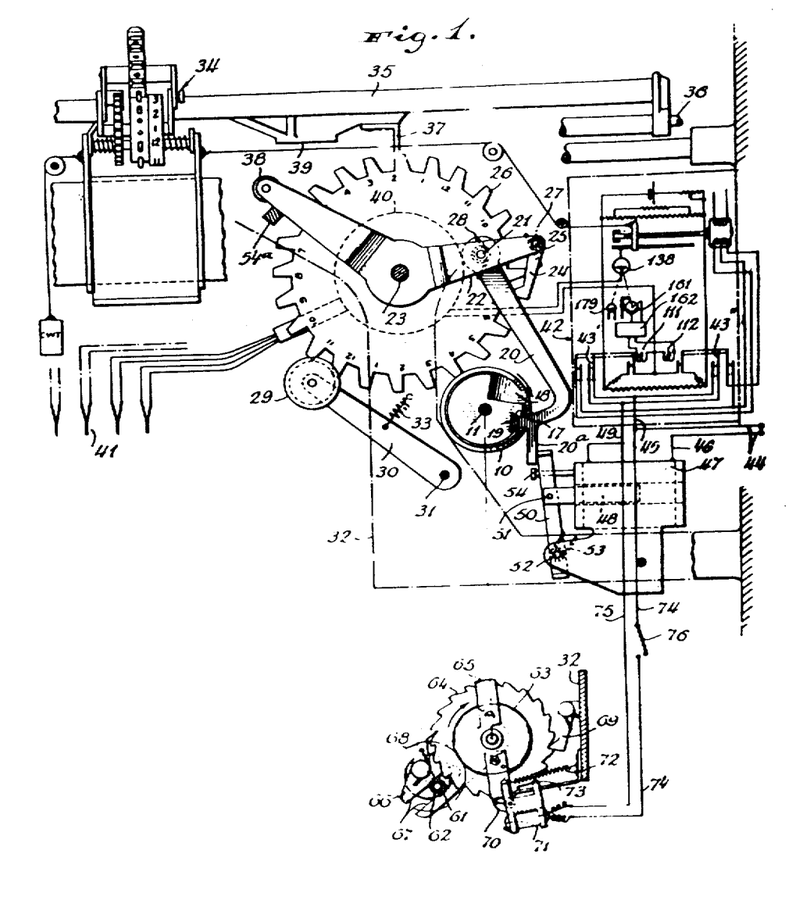
Figures 2, 4, 5, 6, 7:
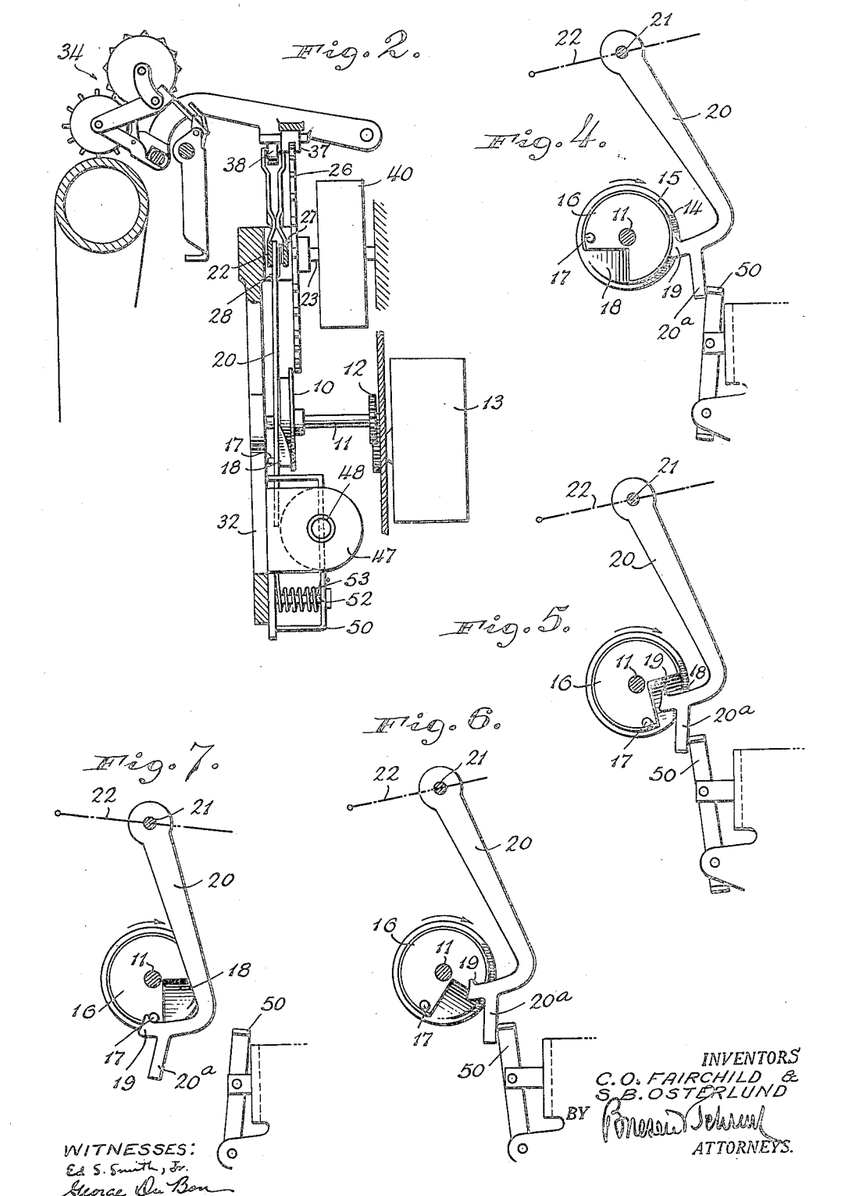
Fig. 2 is a somewhat diagrammatic side elevation thereof, partially shown in section (the cyclically actuated switch and its actuating mechanism shown in Figs. 1 and 8 being omitted in Fig. 2)
Figs. 4–7 are diagrammatic front views showing different positions of the unitary cam and related operating parts.

In Figs. 1 and 2, cam 10 is affixed to shaft 11 which is connected by gearing 12 with synchronous motor 13.

In Fig. 3, cam 10 is shown to consist of a cylinder 14 with a rim 15 having a flat surface normal to the axis of cylinder 14 and contiguous to the cylinder surface at one end; parallel with this flat surface 15 is a disc surface 16 constituting the other end of cylinder 14. Pin 17 projects from the face of disc 16 at a point near cylinder surface 14. Adjacent to pin 17 and on the trailing side therefrom, is notch 18 which may be formed by running a side mill, or cut, of relatively long radius in from the periphery of cylinder 14 and tangentially to rim surface 15, thus forming a notch with one side normal to disc 16 and paralleling a plane connecting the axis of cylinder 14 and projecting pin 17 to interrupt cylindrical surface 14 so that the notch continues smoothly into surface 15 without a break and the curved surface of the notch extends in to form a radial line where it meets disc 16. In other words, this notch is so shaped as to permit hook end 19 of link 20, (see Fig. 1,) to slide from surface 15 on to the surface of disc 16. The upper end of link 20 is pivotally connected by pin 21 with one arm of bell-crank lever 22 oscillatable upon shaft 23. Pawl 24 is pivotally mounted by means of pin 25 on the end of the same arm of lever 22. This pawl 24 cooperates with the teeth of ratchet disc 26, pawl 24 being arranged to contact these teeth, being biased into contact with the teeth of ratchet disc 26 by coil spring 27. Spring 28 biases the depending link 20 towards the right in Fig. 1 and also towards the rear, i. e. to the right in Fig. 2, so that link 20 normally rides on rim surface 15. Roller 29, rotatably mounted on lever 30, which is pivotally secured by pin 31 to base 32, is urged towards disc 26 by spring 33 with sufficient force to accurately position ratchet disc 26.

Means arranged for sequential operation, as printing means 34, conventionally having distinguishable different colors or characters is carried by frame 35 that is oscillatably mounted on fixed rod 36. Depending from frame 35 and affixed thereto is stud projection 37, shown resting by gravity on one of the teeth of ratchet disc 26, such teeth being flat for this purpose. Roller 38 is rotatably mounted on the end of the other arm of lever 22 (remote from that arm upon whose end pawl 24 is attached). The lower surface 39 of frame 35 forms a rail for roller 38 upon the oscillation of lever 22 along with the arm thereof carrying roller 38 in its uppermost position, the various elements being arranged to cause roller 38 to engage rail 39 to raise the depending stud 37 of frame 35 from the bottom of the ratchet teeth of disc 26 to the top thereof. Elements 28—39 are conventional means used in the sequential printing of variable values corresponding to a condition at a plurality of differently located points.

Attached to disc 26 is commutator switch 40 for a plurality of thermocouples, shown diagrammatically as 41, individually connected with this switch 40 in a sequence depending upon the position of the ratchet disc 26 and hence of switch 40. Switch 40 is connected with the potentiometer 42 having relay switch means 43' and 43" adapted to be opened only when the potentiometer is in a substantially balanced condition and which switch means may be conventionally arranged generally as in Fig. 1 on page 496 of the French publication: Kolowrat, Electro-optical regulation. Jl. d. Phys., pp. 495–497; 1909, or as is relay switch 63 in U. S. Patent 1,558,828 to Brace, i. e., when printing means 34 is in a position accurately corresponding with the temperature then existing at one of thermocouples 41.

Also by way of example, with potentiometer 42 as shown in U. S. Patent 1,970,559 to Fairchild, owned by the assignee of the invention of the present patent, the coil of relay switch means 43' and 43" would be located in the common line 45 of Fig. 1 of this patent and the usual periods would be followed in general, the shutter operating period however being considerably less than that of cam 10 in this application. Referring to this patent, there are five zones: a central dead zone in which no current flows in common line 45, two outside zones in which the current flows continuously to cause the reversing motor to operate steadily in the proper direction to balance, and two intermediate zones, each between the dead zone and its adjacent continuous operation zone, in which current flows cyclically, e. g. for about 0.2 second every 1.5 seconds. Thus with the usual 3 seconds, or longer, period of cam 10 of this application, printing could occur only while within the dead zone.

Alternatively, potentiometer 42 may be of the improved photoelectric type shown in Figs. 1 and 8 herein with advantageous operation as will be described later in the present application. In Fig. 1, potentiometer 42 is shown connected by a cord with printing means 34, said cord being tensioned by a counter-weight on the left side of this figure, attached by a cord to the other side of printing means 34. Current supply means 44 is connected by wire 45 with the relay switches 43' and 43" and by wire 46 with electromagnet 47. Arm 50 is pivotally attached by pin 51 to armature 48 and is pivotally mounted on pin 52 attached to the base 32. Spring 53 is attached to base 32 and to arm 50 and adapted to move arm 50 to the left in Fig. 1 as long as switch 43 is open, thus bringing the upper end of arm 50 into engagement with the depending portion 20a of link 20 with sufficient force to overcome the spring 28 and thus force hook end 19 of link 20 against cylindrical surface 14, (as shown in Fig. 4,) of cam 10, until notch 18 therein meets the hook end 19 of link 20. As shown in Fig. 5, link 20 is then forced to the left so that it slides onto the face of disc 16 as shown in Fig. 6. The hook end 19 is adapted to be engaged by pin 17 projecting from the face of disc 16 to move link 20 down and to the left, thus lowering pin 21 attached to the upper end of link 20 and, through lever 22, pin 25 and pawl 24, rotating the ratchet disc 26 one notch in a clockwise direction, after which pin 17 passes from engagement with hook end 19 and link 20 is thrown to the right by spring 28, in Fig. 1, to again engage the upper end of arm 50.

Whatever of this portion of our invention is not readily understood from the drawings and the above description will appear in the following description of the operation:

When ratchet disc 26 starts to turn to a new position, stud 37 at once drops off of the tooth of disc 26 to cause the printing operation of recording means 34. The further slow turning of ratchet disc 26 causes commutator switch 40 to connect the next thermocouple of the series 41 with potentiometer 42. When the temperature of this thermocouple is different from that of the one latest connected, potentiometer 42 will move recording marker means 34 toward a new position while at the same time causing the rebalancing of the galvanometer in the potentiometer circuit. When this condition of galvanometer balance is substantially attained, switch means 43' and 43" in potentiometer 42 will open the circuit connected with electromagnet 47. If this is a mere momentary breaking of the circuit, armature 51 will momentarily be released and tend to move towards the left in Fig. 1. However, this would normally not cause hook end 19 of link 20 to immediately enter notch 18 of cam 10 since hook end 19 will ordinarily then abut the rotating cylindrical surface of the cam 10 as in Fig. 4.

However, when the condition of substantial balance exists at the time when the notch has come around to the hook end 19, it is apparent that hook end 19 will drop into notch 18 as in Fig. 5 and, with the turning of cam 10, slide onto the disc surface 16 thereof, as in Fig. 6, remaining there only as long as magnet 47 is deenergized and unless it is engaged by pin 17, since spring 28 continuously biases arm 20 away from disc surface 16. Assuming that the condition of balance exists for a subsequent interval of nearly a complete revolution of cam 10, it is clear that pin 17 will engage hook end 19 of link 20, as in Fig. 7, to pull it down and cause lever 22 to be oscillated in a clockwise direction in Fig. 1, thus gently turning ratchet disc 26. The other end of lever 22 is thus raised from fixed stop 54a and moved through a distance sufficient to advance the ratchet disc 26 only one tooth, at which time roller 29 will drop into the space between two teeth on disc 26 to retain it in accurate registration for the next operation. The clockwise (Fig. 1) oscillation of lever 22 brings roller 38 against rail 39 to raise printing carriage 35 so that its depending stud 37 clears the top of the teeth of ratchet disc 26 so that ratchet disc 26 is not required to perform this function. The further rotation of cam 10 causes the pin 17 to rise thus permitting the lefthand (in Fig. 1) arm of lever 22 to gradually drop by gravity, such lefthand arm being heavier than the arm thereof attached to link 20, until such lefthand end of lever 20 rests against stop 54, after which, pin 17 rises clear of hook end 19 of link 20. The order of the resultant over-all operation is: movement of ratchet disc 26 in a clockwise direction first permits depending stud 37 to drop into the space between the teeth of ratchet disc 26 to cause the operation of printing means 34, after completion of which, switch 40 is brought into contact with the next thermocouple.

REGULARLY PRINTING MECHANISM AND SELECTIVE SWITCH

The foregoing description of the high speed recorder and its operation generally follows that of our earlier identified application, of which this is a continuation in part. Below follows the corresponding description of the same recorder adapted to normally print at regular intervals which are a fraction of the time for full chart traverse, and of the means for manually selecting whether the recording will be at high speed as above described or at any of such regular fractional intervals.

Figure 8:
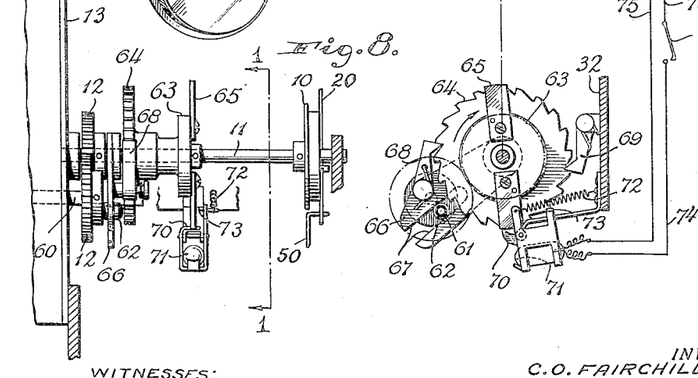
Fig. 8 is a somewhat diagrammatic side elevation of a portion of the apparatus shown in Fig. 1 made from the opposite side from that of Fig. 2.

In Figs. 1 and 8, shaft 60 of constant speed motor 13 runs continuously at 20 R. P. M. and drives cam shaft 11 and its attached cam 10 also at 20 R. P. M. through spur gearing 12 so that cam 10 provides a 3 second balance-testing period.

Affixed to the spur gear 12 which is mounted on motor shaft 60 is stud pin 61 which has roller 62 rotatably mounted on such pin. Spool 63, freely rotatable on cam shaft 11, has a twenty-tooth ratchet wheel 64 and a pair of cams 65 respectively affixed to its opposite ends. Between the spur gear 12 on shaft 11 and spool 63 on shaft 11 is freely oscillatable pawl arm 66 having a radial slot with parallel edges 67, the slot width being slightly greater than the outside diameter of roller 62, disposed therein, to provide working clearance. Pawl 68 is pivotally mounted on arm 66 and spring-biased towards its ratchet wheel 64. Detent pawl 69 is similarly disposed with respect to ratchet wheel 64 and pivotally mounted on base 32. The arrangement is such that the complete rotation of motor shaft 60, carrying roller 62, every 3 seconds causes pawl arm 66 to oscillate enough to advance ratchet wheel 64 one tooth every 3 seconds to its next position, where it is retained by detent pawl 69 until the next forward movement of pawl 68.

Cams 65 are diametrically disposed and move with ratchet wheel 64 to actuate lever 70 of tiltable enclosed mercury-bridge switch 71 to cyclically open the contacts thereof for substantially 3 seconds, the cycles having a period of 30 seconds in the illustrative disclosure of Figs. 1 and 8. Spring 72 biases detent arm 73 of switch 71 towards its mounting bracket, which is affixed to base 32, to hold switch 71 in a closed position as long as neither of cams 65 is coacting with switch lever 70. The widths of equal cams 65 and the coacting end of lever 70 are such that switch 71 is opened by one advancing swing of pawl 68, and is closed by the next advancing swing so that, as above mentioned, the open time is substantially 3 seconds. Cam 10 is so timed relative to cams 65 that lever end 19 can slide into its notch soon after either of cams 65 opens switch 71, after which cam 10 rotates to engage the hooked end 19 by its pin 17 (if both of switches 43' and 43" are also then steadily open) and pull lever 20 down to angularly advance ratchet disc 26 one tooth and release hooked end 19 from pin 17 before switch 71 is again closed.

The terminals of switch 71 are connected by lines 74 and 75 respectively with lines 46 and 49. Manually operable switch 76, in line 74, is in series with switch 71. Thus when switches 71 and 76 are both closed, they pass current from line 44 through solenoid coil 47 to draw in its armature 48 regardless of the condition of relay switches 43' and 43". The operation of the above described manually-operated switch and cam-operated switch and the actuating mechanism is clear from such description.

Printing cam 10 acts to test whether a condition of balance obtains (i. e., whether relay switches 43' and 43" remain open) for a period of time long enough to indicate that substantial correspondence has been attained between the value being measured and another value in the potentiometer circuit determined by the position of the marker. On the average, with a 12 point recorder, from 10 to 15 seconds are required for the position of the marker to approach correspondence closely enough so that the relay-switch-determined condition of balance persists for a large enough portion of 3 seconds to cause printing and the advance to the next thermocouple.

With switch 76 continuously closed and interruptor switch 71 closed for substantially 27 out of each 30 seconds, and timed as earlier described, the recorder prints regularly every 30 seconds as long as the balancing period exceeds approximately 3 seconds, or in other words it prints regularly as long as the marker has substantially reached the proper position at the printing time; if it has not, then the same thermocouple remains connected for another 30 seconds, and so on. As noted in the preceding paragraph, the balancing period governs the printing whether switch 76 is open or closed.

It may be noted that limit switches, not shown, may be included in the present combination to cause the printing and advance to occur when the marker reaches, or slightly exceeds, either limit of its chart, as described in U. S. Patent 2,207,343 which matured from application S. N. 56,880 of C. O. Fairchild, filed Dec. 31, 1935 and owned by the assignee of the invention of the present application.

The limit switches are operated in a conventional manner by printing means 34 when such means reaches its limit of travel and would then be effective, e. g., to open the circuit for electromagnet 47, a feature which is not claimed hereinbelow.

In view of the mode of operation described above, the responsiveness of the potentiometer is involved and a brief description of the potentiometer's circuits is pertinent.

ELECTRICAL CIRCUITS

This potentiometer is generally as described in the two following U. S. applications, also owned by the assignee of the invention of the present application: S. N. 131,843, filed March 19, 1937 by C. O. Fairchild; and S. N. 137,588, filed April 17, 1937 by C. O. Fairchild and V. L. Parsegian.

Figure 9:
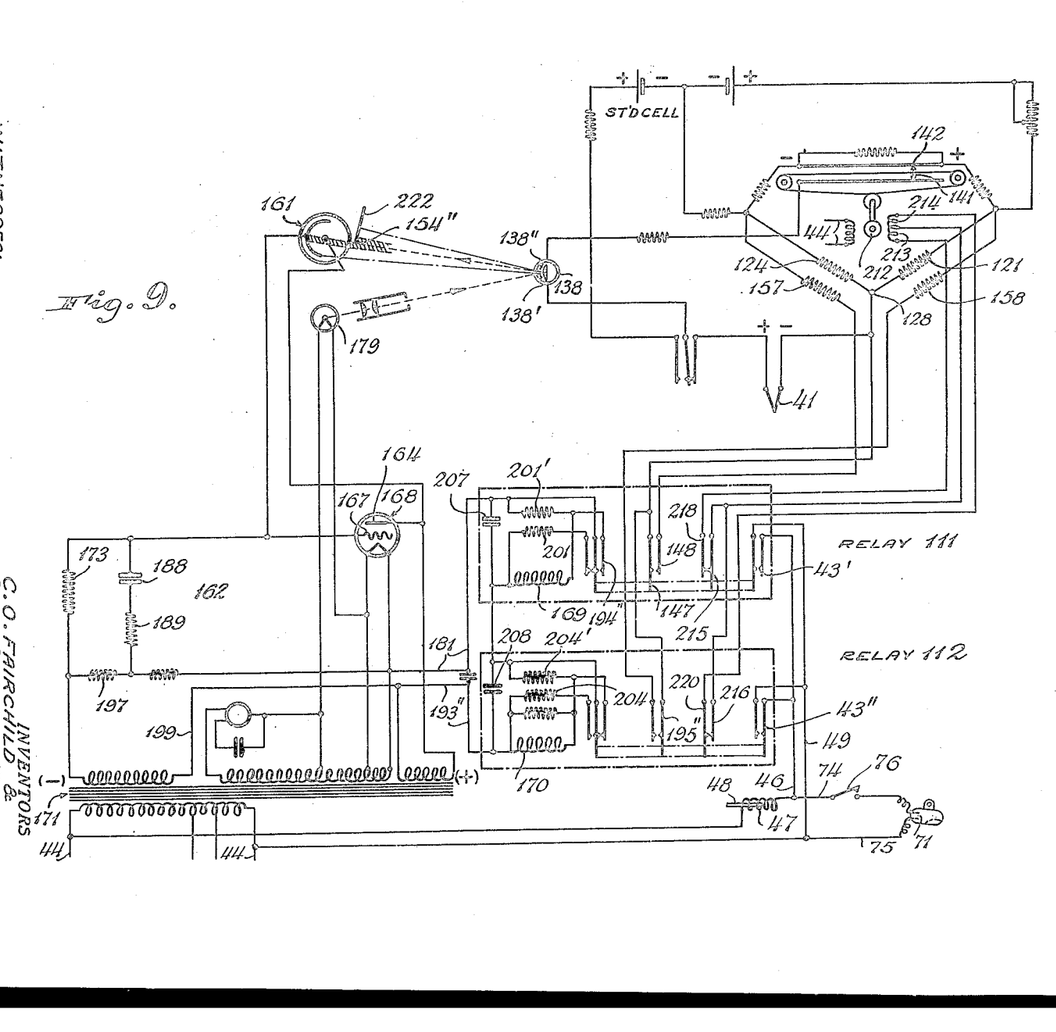
Fig. 9 is a diagram of the electric circuits, generally as in Fig. 1 but with the potentiometric circuit especially shown in detail.

As best shown in Fig. 9, the device has four separate circuits:

A. Potentiometer circuit, including
    B. Means for advancing the phase of the galvanometer;
C. Reversible motor circuit;
D. Photoelectric circuit, including
    E. A delayed amplifier,
    F. Means for making the relay opening currents greater than their closing currents,
    G. Means for stabilizing plate current during relay operation, and
H. Printing governing circuit.

A.—Potentiometer circuit

The slide-wire potentiometer circuit includes a thermocouple 41 and mirror galvanometer 138 connected in series between the movable contacts 141 and point 128, the galvanometer being permanently connected to said contacts as described in the previously mentioned Fairchild U. S. application, Serial No. 56,880. The potential of the point 128 is altered by relay operation as explained in the next paragraph.

B.—Means for advancing the phase of the galvanometer

In the balanced condition of the potentiometer, i. e., with the galvanometer at its normal position with no current flowing through it, relay 111 is closed and relay 112 open, the light-beam being split by the controlling edge 154" of the phototube 161. In this position of the relays, point 128 is at its normal potential. When the relays are both open, or both closed, the potential of point 128 is lowered or raised respectively, changing this potential in each case so that the galvanometer deflection is less than it would be without cooperation with the relays. These changes in the potential of point 128 result in an advance of the position of the galvanometer with reference to that of the moving contacts 141, as both move towards the balance point.

C.—Reversible motor circuit

A shaded-pole reversible motor has its shading coils 213, 214 respectively connected to the contacts 215, 218 and 216, 220 respectively of relays 111 and 112. In the balanced condition, both coils are shortcircuited by said contacts and the motor is stationary. When both relays are open, only coil 214 is shorted thus driving contacts 141 upscale; and when both relays are closed, only coil 213 is shorted thus driving contacts 141 downscale.

D.—Photoelectric and amplifier circuit

This comprises the phototube 161 and amplifier 162 including amplifier tube 168, (see Fig. 1) light source 179, transformer 171 and relays 111 and 112. This circuit is not electrically connected with the potentiometer or reversible motor circuits but cooperates with these only through relay contacts.

E.—Grid circuit of amplifier

The grid circuit of the amplifier includes, in special arrangement, capacitor 188 and resistor 189, the two in series being shunted by resistors 173 and 197. The grid return connection traverses the relay circuit through conductors 199, 193" and 181 to the filament. This circuit is so designed that sudden illumination of the phototube results in a sudden change of grid voltage and hence of plate current to a predetermined value within the dead zone of balancing, followed by a slow rise. Inclusion of the relays in the grid return circuit increases the amplification of the photoelectric current.

F.—Relay opening currents greater than closing currents

This means that if a current between the opening and closing values flows through the relay coils, the relays will oscillate. This is accomplished by shunting the coil 169 of relay 111 with resistor 201 and the coil 170 of relay 112 with resistor 204, these resistors being connected with respect to series resistors 201' and 204' as shown. The periods of relay oscillation are controlled by shunting capacitors 207 and 208 which are chosen in any particular case in relation to the impedances of the relay coils and series and shunting resistors according to the requirements such as scale range, galvanometer sensitivity and reversible motor speed.

G.—Stabilizing plate circuit during relay operation

Additional resistors 201' and 204' on relays 111 and 112 cooperate with back contacts 194" and 195" to maintain the impedance of the plate circuit constant during relay operation. It may be noted here that mirror 138' of galvanometer 138 is provided with stop 138" which keeps the image from passing off of phototube 161 when mirror 138' tends to turn in a counter-clockwise direction in Fig. 9.

Approaching balance point, light off phototube, both relays open

Having identified and described the essentials of the circuit, let us suppose that the E. M. F. of thermocouple 61 is considerably more than the difference in potential between points 128 and 141 in the potentiometer, that the galvanometer 138 is deflected proportionately to this difference in potential, and that the beam of light is off phototube 161 on the far side of the controlling edge 154" of shield 222, up in Fig. 9. With no light from such beam reading phototube 161, grid 167 assumes a sufficiently high negative bias to cause both of the relays to open. Contacts 215, 218, connected to the shading coil 213 are open, allowing the still-shorted shading coil 214 to cause the motor 212 to turn in such direction as to move the contacts 151 upscale (to the right in Fig. 9) towards a new balance point. Also contacts 147, 148 close and resistor 157 shunts resistor 124, lowering the potential of point 128 and reducing the galvanometer deflection.

The contacts 141 are now moving rapidly along slide-wire 142 towards a new position and the galvanometer is approaching its undeflected position under the influence of the restoring torque of its suspensions and of the decreasing potential difference between point 128 and the moving point 141. At any instant during this return movement, the galvanometer, because of the retarding effect of its back E. M. F., would ordinarily lag behind the position corresponding to that of point 141. Instead, the advancing E. M. F. imposed by the change in potential of point 128 puts the galvanometer slightly ahead of point 141. Offhand, it would seem that the galvanometer should theoretically lead the contact sufficiently that despite the time involved in relay operation, the overrun of the motor and the accompanying movement of point 142, both the galvanometer and point 142 find exact balance on the one stopping of the motor. Actually it is best in practice to have the lead such that the recorder takes a few short balancing steps.

As the center of the light beam rapidly approaches the controlling edge 154", illumination of the phototube begins and the plate current increases. The rapidly-increasing phototube current causes a quick increase of plate current from its minimum value to a value sufficiently high to close relay 111 and stop the motor.

At the instant when the relay current just begins the closing of relay 111, the illumination has already passed the intensity for exact balance and is still rapidly increasing, the motor 212 is traveling at full speed, contact 141 is slightly behind its point of final balance, and the galvanometer is traveling at full speed beyond the balance point under the influence of the temporary advancing E. M. F. and of the moving point 142.

At the instant after the closing of relay 111, contacts 215, 218 close and the motor 212 and contacts 141 begin to stop; contacts 147, 148 open to break the circuit of resistor 157 and restore point 128 to its original potential, and the galvanometer will then quickly stop under the combined influence of its back E. M. F. and the restoring torque of its suspensions, both opposing its momentum.

At the instant when the motor 212 stops, contacts 141 will be at the point on slide-wire 142 required for exact balance with the thermocouple E. M. F. plus the normal potential of point 128, but the galvanometer, although stopping or fully stopped, is well past the point of exact balance and the illumination of the phototube is at the moment considerably higher than the illumination corresponding with exact balance. It is necessary then to sufficiently delay the operation of relay 112 by its shunting capacitors until the galvanometer has returned from its overswing to the point of exact balance under the restoring torque of its suspensions, again opposed by its back E. M. F.

As earlier noted, in practice, it is found practicable to advance the galvanometer to such an extent that it is considerably ahead of contacts 141 as they move towards the balance point. Then when the beam reaches the controlling edge, the relay 111 will close and stop both motor and galvanometer as before. But the contacts 141 will not have reached the point of exact balance so that, when the galvanometer begins to return from its first-stopped position beyond the dead zone, it is brought back to the low-current side of the dead zone, and relay 111 opens but quickly closes again, causing the motor and contacts 141 to take a short step forwards, this being repeated as necessary, and with increasing time between impulses, until a highly precise balance has been reached.

H.—Printing governing circuit

Having described circuits A–G adequately for present purposes, the disclosure is completed by the following resumé describing the printing governing circuit H and its operation in relation to the other portions of the device:

Referring to Figs. 1 and 9, the printing governing circuit includes switches 71, 76, 43' and 43" and solenoid coil 47 connected together and to supply 44 by lines 45, 46, 49, 74 and 75 so that no current flows through solenoid coil 47 only when switches 71, 43' and 43", or 76, 43' and 43", are simultaneously open, generally as described earlier when switches 43' and 43" were considered as a single switch means, switches 43' and 43" being connected in parallel.

With current in the coil of relay 111, i. e., relay 111 closed, switch 43' actuated thereby is open; with no current in the coil of relay 112, i. e., relay 112 opened, switch 43" actuated thereby is open; and vice versa. This first-mentioned condition of the relays, i. e., 111 closed and 112 open, accompanies a balanced condition of mirror galvanometer 138 in which the image of the light beam from light source 179 reflected from the mirror of galvanometer 138 is at rest splitting the edge 154" of phototube 161 as defined by shield 222. Following a sudden change, as when shifting to the next point, capacitor 188 and its accompanying resistors give an initial quick, followed by a slow, response of the current from plate 164 of amplifying triode 168.

The operation of the printing governing circuit, assuming selective switch 76 open and following a shift to a point at higher temperature is as follows: Both relays 111 and 112 open and reversing motor 212 drives marker 34 upscale on the chart until the light image splits the edge 154″ of phototube 161, when the current from amplifier plate 164 reaches such a value that relay 111 is closed while relay 112 remains open, relay 111 tending to oscillate under this condition. The result is that the image is kicked back and again approaches the phototube edge, at the same time moving the marker and its associated sliding contact 141 closer to the balancing position. The balancing period varies inversely with the amount of unbalance assuming that the timing of relay 111 itself is such as to give a substantially constant duration impulse, which, as brought out under the section describing circuit F, is the case.

Printing cam 10 keeps testing the duration between impulses and, when both switches 43' and 43″ simultaneously remain open long enough, the hook end 19 of link 20 slides into the notch in cam 10, up over inclined curved surface 18 and onto cam face 16, is engaged by pin 17 and carried down and to the left in Fig. 1, letting stud 37 drop down into the notch between the teeth of ratchet disc 26. The angular movement of ratchet disc 26 also moves switch 40 to connect the next point with the potentiometer. The dropping of stud 37 carries marker 34 into contact with the chart and advances the marker to its next position. While this marking and printing mechanism is generally as in the aforementioned U. S. application S. N. 56,880 of Fairchild, the present application contains an adequate description for the purpose of describing its improved actuating means and method.

Carrying on the present description, pin 17 carries link 20 further downward and far enough to raise marker 34 and stud 37 by the lift of roller 38 on printing frame rail 39 while disc 26 is turned precisely to its next position where it is spring-held by detent roller 29. The arm of lever 22 carrying roller 38, being heavier than its other arm, then is lowered against its stop 54a as pin 17 rises on the left side of shaft 11, after which pin 17 rises clear of hook 19 so that spring 28 throws link 20 to the right so that its depending portion 20a presses lightly against lever 50. By this time, switch 71 is closed and lever 50 is drawn to the right by the attraction of solenoid 47 for armature 48 which is connected to lever 50. The entire apparatus is now in the condition mentioned at the beginning of this description of the operation of the printing governing means in combination with the remainder of the potentiometer.

In the claims, an expression like "means coacting with the positionable element for performing a function related to the position of the element" in the embodiment described refers to the studs, on positionable carriage 34, which studs make marks on the chart corresponding to the position of the element when projection 37 of frame 35 drops from a tooth of ratchet disc 26; "operating the recording, e. g., instrumentality" refers not to the positioning but to the record-producing action thereof; and the value of the variable is considered to be within the range corresponding with the operating range of the element so that the position of the element may always attain correspondence with such value.

Similarly, the expression "a cam driven at constant average speed" indicates that it is the time for a complete revolution which is to be maintained constant rather than that the instantaneous speed must be constant at each portion of each revolution, e. g., a reciprocating two-cylinder steam engine without an appreciable flywheel action may be governed to have a constant average speed although its instantaneous velocity fluctuates widely in each revolution.

The terms and expressions which we have employed are used as terms of description and not of limitation, and we have no intention, in the use of such terms and expressions of excluding any equivalents of the features shown and described and portions thereof, but recognize that various modifications are possible within the scope of the invention claimed.

We claim:

1. A cyclically operable recorder comprising, in combination, a device including a marker for making a record on a chart only at regular time intervals of a variable value of a physical condition at a position of said marker corresponding with such value even though such value varies so that consecutive recorded values differ substantially from each other; testing means having a cyclically operable portion of shorter period than said intervals for testing such correspondence; and an element governed by the testing means to prevent a marking operation at any regular recording time following a testing period in which such test determines that substantial correspondence has not been attained therein.

2. A cyclically operable recorder comprising, in combination, a device including a marker for making a record of a variable value of a physical condition on a chart only at regular time intervals at a position of the marker corresponding with such value even though such value varies so that consecutive recorded values differ substantially from each other; testing means having a cyclically operable portion of shorter period than said intervals for testing the persistence of such correspondence; and an element governed by the testing means to prevent a marking operation at any regular recording time following a testing period in a major portion of which period substantial correspondence has not persisted.

3. The combination of a device having two portions, one of which is intermittently operable to produce an effect at a position which is related to the value of a physical condition; an instrument for positioning the other portion of said device in correspondence with such value; an actuating device for cyclically operating the first named device to produce such effect; means including a link for operatively connecting said devices; means cyclically operable in regular cycles longer than that of the actuating device and operative during a major portion of its longer cycle; means operative by said instrument in accordance with such correspondence; and an element operable, by either of said two last named means as long as the then operating means is operative, to initiate the disabling of such link connection only while said element is operated; whereby said first named device and its actuating device are operatively connectable by said link only as long as both of said two last named means are simultaneously inoperative.

4. In an intermittently operable recorder, the combination of a marker for a chart; means for governing the positioning of said marker across the chart in correspondence with the value of a physical condition; a device for causing the marker to record its position on the chart at times normally spaced at regular intervals of X seconds each; means operatively connected to said governing means to test such correspondence during a cycle of X/N seconds and for preventing the recording in any cycle in which such testing determines that substantial correspondence does not exist during such cycle, N being an integer larger than unity; a motor; and means driven by said motor to so actuate both said device and said testing means that the recording occurs at the same time-position in each coinciding testing cycle and including a manually adjustable portion for adjusting the absolute time when the testing period should start.

5. A device of the character described comprising, in combination, an instrument including a positionable element intermittently operable to produce an effect and relay means for maintaining the position of said element in correspondence with the value of a physical condition; means connectable to said element to actuate the latter to produce such effect; electromagnetic means adapted and arranged to govern the stated connection of said actuating means to said element upon a cessation of current in its coil; and a circuit connected to said coil and to a source of current and including circuit-opening means connected in series with said coil; said circuit-opening means comprising switch means operable by said relay means, a regularly operable interruptor in parallel with said switch means, and a cutout switch in series with said interruptor.

6. In a recording system including a plurality of sources of variable potential, the combination of a switch selectively connectable with each of said sources; a potentiometer connected with said switch and having recording means having a portion positionable in substantial correspondence with the value of the potential of the selected source, said potentiometer including a galvanometer sensitive to correspondence between such position and the value of the potential of the connected source and relay means operated thereby to control such positioning; said recording means including an actuated portion and means for operating said recording means for the distinguishable recording of each of a sequence of values upon a succession of like operations of its actuated portion; actuating means for said switch and for said actuated portion; means controlled by said relay means for governing the recording operation of said recording means; an element cyclically moving with constant average speed; means biasable toward said element by the governing means upon such correspondence as determined by said galvanometer for operatively connecting said element with said actuating means; and means cyclically operable at regular intervals longer than the period of one cycle of said element and operatively connected with said governing means to render the latter effective only for a short portion of each of such longer intervals just before a regular time in which recording may occur; said element and said governing means being constructed and arranged to cause the initiating of the stated connection of said biasable means with said element only following one of such effective interval-portions in which said biasable means is biased toward said element.

7. In combination, a measuring instrument for the variable value of a physical condition and including a device for producing an operative effect upon the actuation of a portion thereof and having a portion normally positioned in substantial correspondence with such value, means for initiating the operation of the first named portion only at regular periodic times to cause said device to produce such effect even though such value varies so that the positions of said device differ substantially from each other at consecutive ones of said regular times, and means for detecting such correspondence and operative to prevent the first named means from initiating the operation of the first named portion at a time ending any regular one of such periodic times during which such correspondence has not been attained at least shortly before any such stated times of initiation.

8. In combination, a measuring instrument for the variable value of a physical condition and including a device for producing an operative effect upon the actuation of a portion thereof and having a portion normally positioned in correspondence with such value and movable across the total operating range in a predetermined minimum time, means for operating the first named portion only at regular periodic times at shorter intervals than said predetermined minimum time to cause said device to produce such effect even though such value varies so that the positions of said device differ substantially from each other at consecutive ones of said regular times, and means for detecting such correspondence and operative to prevent the first named means from operating said first named portion at a time ending any one of such regular periodic times during which such correspondence has not been attained.

9. In combination, an instrument responsive to the value of a physical condition and including a device for producing an operative effect upon the actuation of a portion thereof and having a portion positionable in correspondence with such value; balancing-governing means including a balancing element responsive to such correspondence for governing the positioning of the positionable portion to maintain such correspondence; means operatively connectable to said element to cause said galvanometer to attain a condition of substantial balance prior to the attainment of the stated correspondence; means for normally operating the first named portion of said device at regular periodic times to cause said device to produce its effect; and means also governed by said element for preventing the second named means from initiating the operation of said device at a time ending one of such periods during which said element has not been rebalanced; whereby from the foregoing combination the operation of said device may be initiated while its last named portion is approaching a position corresponding with such value to thus reduce the maximum interval between its operations.

10. In combination, an instrument for measuring the value of a physical variable, a driving means, a means connectable to the driving means under control of the instrument to cause said instrument to produce upon the occurrence of such connection an operative effect related to the measured value, and means responsive to the attainment of a predetermined measuring status of the instrument at any value of the measured variable, the last named means being constructed and arranged relative to the second named means to cause the operative connection of said driving means with said instrument only at the time following the persistent attainment of said predetermined status for a major portion of the preceding interval.

11. A multiple recorder comprising, in combination, means including a marker for distinguishably and sequentially recording the values of a physical variable such as, e. g., the potentials of each of a number of sources thereof upon a succession of like operations of a portion of said means; a switch selectively connectable in sequence with each of said sources upon a succession of like operations of a portion of it; a self-balancing measuring instrument such as a potentiometer connected with said switch for positioning said marker in correspondence with the value of the potential of the connected source and including a galvanometer sensitive to such correspondence for governing its balancing; an element for operating both said recording means portion, to cause the marker to make a mark, and also said selective switch portion; a circuit; a controlling switch in said circuit which is opened by said galvanometer upon attaining a condition of substantial balance; a rotating cam for determining the duration of persistence of such correspondence; a link and means on the cam for operatively connecting said cam with said operating element to cause the cam to intermittently actuate the element; and electromagnetic means having one portion connected to said circuit and another portion of it operated by its first named portion, said other portion including means biasing said other portion to coact with said link and means to bias the latter toward a position in which said link is engageable by said cam, and only upon a persistent opening of said controlling switch through a major portion of the period of one rotation of said rotating cam effects the coupling of the link and the means on the cam; whereby said element is intermittently operated to cause the marker to make a mark corresponding with the point and the value of the potential thereof, and the selective switch to advance to the next source of potential with a minimum of delay upon the persistent attainment of such correspondence.

12. A multipoint recorder comprising, in combination, means for sequentially recording the values of a physical condition at each of a number of points and including a marker adapted to distinguishably record each of a sequence of such values upon a succession of like operations of a portion of said means; a meter responsive to such values connected with said marker to position the latter in correspondence with said value; means for selectively connecting each of said points in sequence with said meter upon a succession of like operations of a portion of said means; an element for sequentially operating both said marker and said selective means in substantial synchronism; a circuit connectable to a current source; a controlling switch in said circuit which is opened by said meter upon bringing said marker into substantial correspondence with the value of the condition at the then connected point; a rotating cam for determining a period of persistence of such correspondence; a link for operatively connecting said cam with said element to cause the cam to intermittently actuate the element; and electromagnetic means having a portion thereof connected to said circuit and another portion operated by its first named portion, said other portion including means biasing said other portion to coact with said link to bias the link toward a position in which said link is engageable by said cam, upon a persistent opening of said controlling switch through a major portion of the period of one rotation of said rotating cam; whereby said element is intermittently operated to cause the marker to make a mark, corresponding both with the point and the value of the condition thereat, and the selective means to advance to the next point with a minimum of delay upon the persistent attainment of such correspondence.

13. The combination of a cam rotating at constant average speed to establish a regular succession of cycles; an element intermittently operable thereby at a fixed time in any of said cycles; a link having one end attached to said element and the other end movable toward and away from said cam respectively for effective and ineffective connection with said cam; selective means for moving said movable link-end to govern the selective connection thereof with said cam; said cam including a selective portion in which said movable link-end is movable by said selective means from an ineffective to an effective connecting position, a testing portion following said selective portion and over which said movable link-end is movable by said selective means from an effective connecting position but not vice versa, and a link-actuating portion following said testing portion and for engaging said movable link-end at a fixed time in any cycle in which said link-end is then in an effective position to operate said element.

14. The combination of a cam rotating at constant average speed to establish a regular succession of cycles; an element intermittently operable thereby at a fixed time in any of said cycles; a link having one end attached to said element and the other end movable toward and away from said cam respectively for effective and ineffective connection with said cam; selective means for moving said movable link-end to govern the selective connection thereof with said cam; said cam including a selective portion in which said movable link-end is movable by said selective means from an ineffective to an effective connecting position, a testing portion following said selective portion and over which said movable link-end is movable by said selective means from an effective connecting position but not vice versa, and a link-actuating portion following said testing portion and for engaging said movable link-end at a fixed time in any cycle in which said link-end is then in a effective position to operate said element; and said link and cam being adapted and arranged to cause relative sliding of a portion of said cam on a portion of said movable link-end in a direction transverse to that of the selective motion thereof while said movable link-end is coacting with said testing portion of said cam whereby the motion of said movable link-end in a direction away from an effective position thereof is then retarded.

15. In an intermittently marking device, the combination of a meter sensitive to a physical condition; a marker having its position across a chart maintained by said meter in correspondence with the value of the condition; a cam rotating at constant average speed to establish a regular succession of cycles; an element intermittently operable to cause said marker to make a mark at the then position thereof; a link having one end attached to said element and the other end movable toward and away from said cam respectively for effective and ineffective connection therewith; selective means actuated by said meter in response to the attainment of such correspondence for moving said movable link-end to govern the selective connection thereof with said cam; said cam including a selective portion in which said movable link-end is movable by said selective means from an ineffective to an effective connecting position upon the attainment of such correspondence, a testing portion following said selective portion and over which said movable link-end is then movable by said selective means from an effective connecting position upon a failure of such correspondence but not vice versa upon a subsequent attainment of correspondence thereafter, and a link-actuating portion following said testing portion and for engaging said movable link-end at a fixed time in any cycle in which said link-end is at such time in an effective position for causing the marking-initiating operation of said element.

16. In an intermittently marking device, the combination of a meter sensitive to a physical condition; a marker having its position across a chart maintained by said meter in correspondence with the value of the condition; a cam rotating at constant average speed to establish a regular succession of cycles; a element intermittently operable to cause said marker to make a mark at the then position thereof; a link having one end attached to said element and the other end movable toward and away from said cam respectively for effective and ineffective connection therewith; selective means actuated by said meter in response to the attainment of such correspondence for moving said movable link-end to govern the selective connection thereof with said cam; said cam including a selective portion in which said movable link-end is movable by said selective means from an ineffective to an effective connecting position upon the attainment of such correspondence, a testing portion following said selective portion and over which said movable link-end is then movable by said selective means from an effective connecting position upon a failure of such correspondence but not vice versa upon a subsequent attainment of correspondence thereafter, and a link-actuating portion following said testing portion and for engaging said movable link-end at a fixed time in any cycle in which said link-end is at such time in an effective position for causing the marker-initiating operation of said element; and said link and cam being adapted and arranged to cause relative sliding of a portion of said cam on a portion of said movable link-end in a direction transverse to that of the selective motion thereof while said movable link-end is coacting with said testing portion of said cam whereby the motion of said movable link-end in a direction away from an effective position thereof is then retarded.

17. The combination of a cam rotating at constant average speed to establish a regular succession of cycles; an element intermittently operable thereby at a fixed time in any of said cycles; a link having one end attached to said element and the other end movable toward and away from said cam respectively for effective and ineffective connection therewith, said link being continuously biased away from said cam; selective means for moving said movable link-end to govern the selective connection thereof with said cam; said selective means including an electromagnet and its armature, said armature being continuously biased away from said electromagnet to push said link-end toward said cam more strongly than said link-end is continuously biased away therefrom; said cam including a selective portion in which said movable link-end is movable by said armature from an ineffective to an effective connecting position upon a cessation of current in said electromagnet, a testing portion following said selective portion and over which said movable link-end is movable from an effective connecting position upon the attraction of said armature to said electromagnet upon an appreciable current in the latter but not vice versa upon a subsequent cessation of said current, and a link-actuating portion following said testing portion and for engaging said movable link-end at a fixed time in any cycle in which said link-end is then in an effective position to operate said element.

18. In an intermittently marking device, the combination of a meter sensitive to a physical condition; a marker having its position across a chart maintained by said meter in correspondence with the value of the condition; a cam rotating at constant average speed to establish a regular succession of cycles; an element intermittently operable by said cam to make a mark at the then position thereof; a link having one end attached to said element and the other end movable toward and away from said cam respectively for effective and ineffective connection therewith; a switch which is opened by said meter only when substantial correspondence exists; a circuit including a source of current and connected with said switch; selective means for moving said movable link-end to govern the selective connection thereof with said cam, said selective means including an electromagnet connected to said circuit and an armature for said electromagnet, said armature and said movable link-end being constructed and arranged to push the latter toward said cam when said switch is open and to retract the latter from said cam when said switch is closed; said cam including a selective portion in which said movable link-end is movable by said armature from an ineffective to an effective connecting position upon the opening of said switch accompanying such correspondence, a testing portion following said selective portion and over which said link-end is movable from an effective connecting position upon the closing of said switch accompanying lack of correspondence but not vice versa upon a subsequent opening of said switch acccompanying reattainment of such correspondence, and a link-actuating portion following said testing portion and for engaging said movable link-end at a fixed time in any cycle in which said link-end is at such fixed time in an effective position to operate said element.

19. The combination set forth in claim 13 in which said cam includes a cylinder for preventing motion of said movable link-end from an ineffective to a record-effecting position and having a notch in said cylinder in which said link-end is movable, a disc contiguous to said cylinder and also interrupted by said notch, said link-end being movable over said disc to either of said positions, and a stud projecting from said disc adjacent said notch and adapted to operatively engage said link-end to effect a connection therewith only after said link-end has remained continuously on said disc from the time when said link-end has moved from said notch onto said disc portion until such link-end is engaged by said stud.

20. The combination set forth in claim 13 in which the said link is constructed and arranged relative to said element to bias its end which co-acts with said cam in a direction toward said cam and transverse to the direction of motion thereof and in which the connection of the link with the element is pivotal and with the axis of pivoting normal to the direction of motion of the cam, whereby the end of the link which is connectable with the cam is selectively movable in one direction relative to an effective connecting position and in another and transverse direction in response to a predetermined status of said selective means and to the persistence of such status.

21. The combination of a cam rotating at constant average speed to establish a regular succession of cycles; final means including an element intermittently operable thereby at a fixed time in any of said cycles and positionable in correspondence with the value of a physical condition; a link having one end attached to a portion of said final means and the other end movable toward and away from said cam respectively for effective and ineffective connection with said cam; selective means for moving said movable link-end to govern the selective connection thereof with said cam; means sensitive to such correspondence and operatively connected with said element to govern the positioning thereof and with said selective means to cause the latter to bias said movable link-end toward a position of effective connection with said cam when said means senses such correspondence; said cam including a selective portion in which said movable link-end is movable by said selective means from an ineffective to an effective connecting position upon the attainment of such correspondence, a correspondence-persistence testing portion following said selective portion and over which said movable link-end is movable by said selective means from an effective connecting position upon a failure of such correspondence but not vice versa upon a subsequent reattainment of such correspondence in the same cycle, and a link-actuating portion following said testing portion and for engaging said movable link-end at a fixed time in any cycle in which said link-end is then in an effective position to operate said element at a position thereof which corresponds with the value of such condition.

22. The recorder set forth in claim 2, including a motor running at constant average speed to drive both said device for operating the marker thereof at said regular recording times when the stated persistence of correspondence has existed and the cyclically operable portion of the testing means, and said device including a means sensitive to the stated correspondence, which means is operatively connected with the cyclically operable portion of the testing means in such a time relation with the stated regular recording time that said element operates to prevent a marking operation at a regular recording time only when such testing determines that substantial correspondence has not persisted shortly before such time.

23. In combination, an instrument responsive to the value of a physical condition and including a device for producing an operative effect upon the actuation of a portion thereof and having a portion positionable in correspondence with such value; balancing-governing means including a balancing element responsive to such correspondence for governing the positioning of the positionable portion to maintain such correspondence and said balancing-governing means including means operatively connected with said element to stabilize the stated governing when said element is oscillating as due to vibration and without delaying the initial response of such governing to departures from balance of the element; actuating means for normally operating the first named portion of said device at regular periodic times to produce its effect; and means also governed by said element for preventing the actuating means from operating said device at a time ending one of such periods during which said element has not been rebalanced; the stabilizing means of the balancing-governing means also acting upon the last named means to stabilize the action thereof.

24. In combination, a measuring instrument for the variable value of a physical condition and including a device for producing an operative effect upon the actuation of a portion normally positioned in substantial correspondence with such value, means for initiating the operation of the portion only at regular periodic times to cause said device to produce such effect even though such value varies so that the positions of said device differ substantially from each other at consecutive ones of said regular times, and means for detecting such correspondence and operative to prevent the first named means from initiating the operation of the portion at a time ending one of such regular periodic times during which such correspondence has not been attained at least shortly before any such stated times of initiation.

CHARLES O. FAIRCHILD.
SOREN B. OSTERLUND.

CERTIFICATE OF CORRECTION.

Patent No. 2,209,717.  July 30, 1940.

CHARLES O. FAIRCHILD, ET AL.

It is hereby certified that error appears in the above numbered patent requiring correction as follows: In the drawing, Sheet 1, Figure 1 should appear as shown below instead of as shown in the patent - page 2, second column, lines 17 and 24, for "interrupter" read --interruptor--; page 3, second column, line 11, for "Swith" read --Switch--; page 4, first column, line 13, for "disc 25" read --disc 26--; page 8, second column, line 15, claim 7, for "regular one of such" read --one of such regular--; page 10, first column, line 28, claim 16, for "a" before "element" read --an--; and second column, line 54-55, claim 18, for "acccompanying" read --accompanying--; page 11, second column, line 51, claim 24, after "ending" insert --any--; and that the said Letters Patent should be read with this correction therein that the same may conform to the record of the case in the Patent Office.

Signed and sealed this 24th day of September, A. D. 1940.

Henry Van Arsdale,
Acting Commissioner of Patents.

(Seal)